June 17, 1958  M. S. CLARK  2,839,314
QUICK DETACHABLE COUPLER
Filed June 8, 1954  2 Sheets-Sheet 1

INVENTOR.
MALCOLM S. CLARK
BY Woodling and Krost
Attys.

June 17, 1958
M. S. CLARK
2,839,314
QUICK DETACHABLE COUPLER
Filed June 8, 1954
2 Sheets-Sheet 2
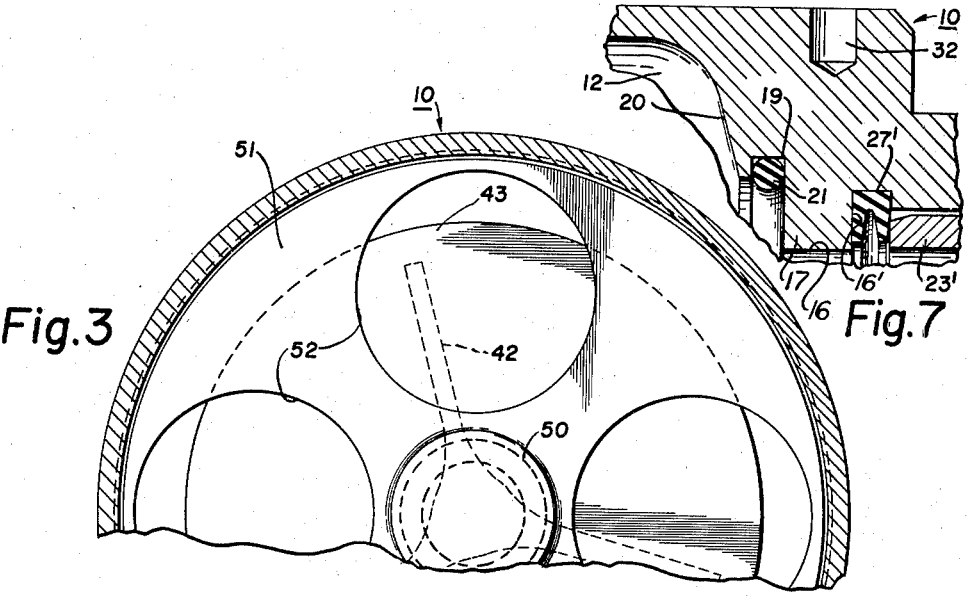
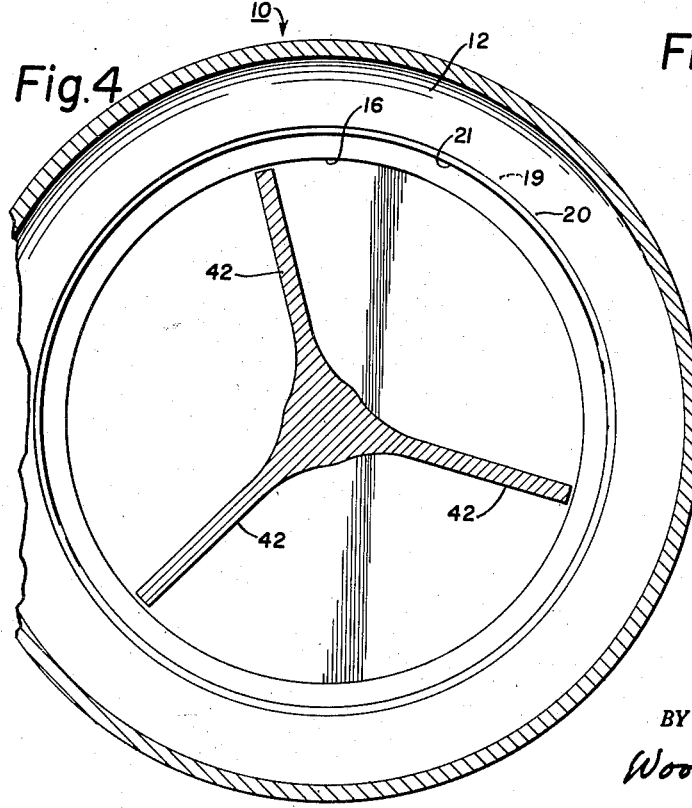
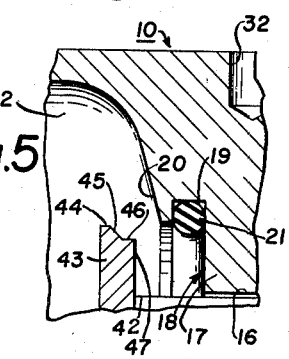
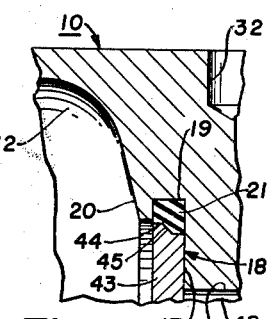
INVENTOR.
MALCOLM S. CLARK
BY

2,839,314

QUICK DETACHABLE COUPLER

Malcolm S. Clark, Union City, Pa., assignor to Snap-Tite, Inc.

Application June 8, 1954, Serial No. 435,188

1 Claim. (Cl. 284—18)

This invention relates to new and useful improvements in quick detachable couplers of the general type disclosed in my copending application Serial No. 390,594, filed November 6, 1953, and in which a valve is mounted in either or both members of the coupler to stop the flow of a fluid medium therethrough when the members are separated.

An important object of this invention is the provision of a valved coupler which provides for maximum free flow of the fluid medium through the coupler with the least amount of restriction to this flow when the two units or members are coupled.

Another object is the provision of a coupler with a valve which is constructed to have a metal to metal contact with its seat when in a closed position under pressure.

A further object is the provision of sealing material for the valve which is carried by the casing member of the coupler instead of by the valve body to provide cleaner lines of flow and to reduce the possibility of washing the sealing material out of its mounting.

Incidental to this improved structure, is the important result of providing a controlled amount of compression and displacement of the sealing material by the positive metal to metal stop of the valve in closed position under pressure, which will make for longer life of the sealing material and eliminate all chances of overloading this material by elongation or placing it in shear.

A further object of the invention is the provision of each of the male and female members with an adaptor which can be easily removed for servicing or replacing of any interior parts of the coupler.

Other objects and a fuller understanding of this invention may be had by referring to the following description and claim, taken in conjunction with the accompanying drawings, in which:

Figure 3 is a transverse section of the coupling taken on the line 3—3 of Figure 1;

Figure 4 is a transverse section taken on the line 4—4 of Figure 1;

Figure 5 is an enlarged sectional view of part of the valve mechanism illustrating the cross-sectional shape of the sealing means prior to engagement of the valve body therewith;

Figure 6 is a view similar to Figure 5 illustrating the valve in closed position with a metal to metal contact with its seat and the sealing conformed to the engaging surface of the valve body and trapped in its recess; and Figure 7 is an enlarged fragmentary sectional view of a section of a coupling member illustrating a modified arrangement of U-shaped seal.

In the use of valved couplers of this general class, it is very desirable to provide a construction which will not impede the free unrestricted flow of fluid through the fluid line in which the coupler is installed. In the conveyance of gases or fluids under high pressure where such pressure or velocity of the gas or fluid tends to overload or dislocate the sealing material, it is essential to provide a construction which precludes such tendencies. In the present instance, this is accomplished by providing a construction in which the sealing material is held in the casing parts and is protected from accidental dislocation, washout or excessive compression by the flow of fluid, or otherwise, and by providing for a metal to metal contact between the valve body and its valve seat when in closed position to fully enclose the sealing material and preclude overloading of the sealing material from compression and shear. It is also desirable that these couplers be adaptable to different sizes of pipe lines, and to this end, as well as to render the interior parts of the coupler more readily accessible for repair and replacement, each coupler unit is constructed to receive an adaptor of appropriate size which serves in holding the valve in place and is readily removable to render the interior parts of the coupler accessible.

Figure 1:
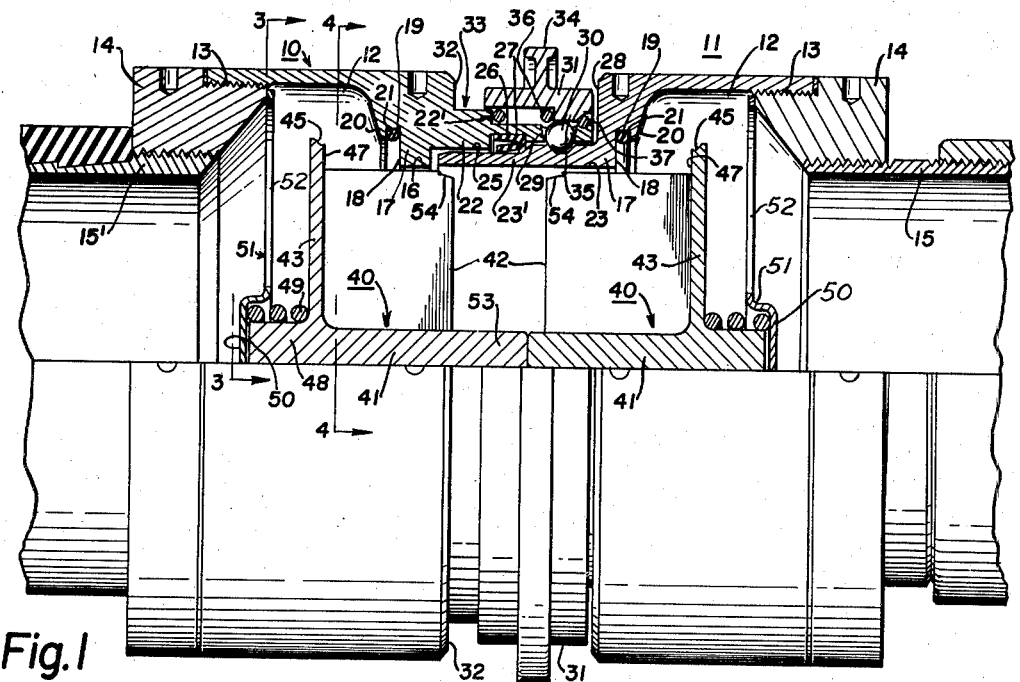
Figure 1 is a side elevation of the coupler with the male and female members in coupled position with their valves open and with one-half of the coupler shown in longitudinal section.

The coupling is illustrated as composed generally of a female coupler casing member 10 and a male nipple casing member 11. The outer ends of these members are preferably exactly the same size, shape and construction, especially when each is to include a self-closing valve mechanism; so that, not only may the valve mechanism for the two members be identical and interchangeable, but the flow of fluid through the pipe line in which the coupler is incorporated will not be restricted or retarded. Thus, the outer end of each member 10 and 11 is preferably formed into an enlarged secondary bore or chamber 12 having internal screw threads 13 for threaded engagement with the external threads of an adaptor ring or sleeve 14. The adaptor may be of any construction suitable for the installation in which it is used and may have a polygonal exterior or it may be a ring or sleeve with radial spanner wrench openings as shown. The bore of the adaptor here shown is threaded to an end of a pipe line 15 or to a barbed pipe extension 15′. The enlarged bore 12 tapers down to a smaller primary bore 16 in the female member which is preferably at least as large in diameter as the pipe line. In the male member 11, the enlarged bore 12 tapers down into a smaller primary bore 23, which is substantially the same diameter as the smaller primary bore 16 in the female member. Thus, the smallest bore through both male and female members is substantially as large as the bore through the pipe line so that the fluid flow through the coupling is not restricted or retarded. This difference in the size of the primary and secondary bores provides each coupling member with an annular valve seat shoulder 17 having a metal valve seating surface 18 and a surface 16′, both arranged normal to the axis of the coupler. Adjoining the base of this metallic valve seating surface 18 there is provided in each coupling member, an annular recess 19 opening inwardly toward the axis of the bore. This recess is defined between the seating surface 18 and an annular boundary wall 20 to hold resilient sealing material, here shown as a resilient rubber O-ring 21 in position within the recess of the casing member. A portion of the circumference of this O-ring normally extends radially inward beyond the circumference of the boundary wall 20 as shown in Figures 1 and 5. Thus, in this application, the O-rings 21 are carried by the casings of the coupling members, protected from washouts by fluid flow; rather than being carried by the movable valve bodies in the direct paths of fluid flow as is the case in my aforesaid copending application.

The inner end of the female coupler member 10 is formed with an integral axially extending reduced sleeve portion 22 which is counterbored to receive therein a reduced nipple portion 23' of the male member 11. The free inner end of this female sleeve 22 is counterbored as at 25 to provide a wall which is provided with a packing groove 26 to receive therein a rubber U-shaped packing ring 27 having a pair of spaced tapered or feathered arms, one of which seats in the groove 26 and the other arm of which inclines toward the axis of the female member to seal against the nipple 23' of the male member to prevent leakage of fluid through the coupling. The location of this U-shaped packer 27 may be shifted in the bore 25 to a groove located at the base of the face 16' of shoulder 17. In such case, the packer would be a ring 27' with its groove between the two arms facing or opening inwardly toward the axis of the coupler, as shown in Figure 7 to form an abutment seal for engaging the free end of nipple 23' when the male and female members are coupled. The sleeve 22 is shouldered as at 22' for a purpose which will presently appear. The end portion of the male member 11, which is reduced in external diameter to provide the reduced nipple 23', also provides an annular shoulder 28. This nipple is provided with an annular ball-locking groove 30'. The end portion of the female sleeve 22 is provided with a plurality of circumferentially spaced radially extending tapered openings 29 to receive locking detents or balls 30 which are adapted to enter the nipple groove 30' when the members are coupled together. Any number of these openings and balls can be provided, although only four have been illustrated herein. These openings are tapered toward the axis of the coupler to allow the balls to move inwardly sufficiently to seat and lock in a groove 30' of the male nipple, but yet prevent them from dropping inwardly out of these openings when the nipple is separated from the female member. These balls are normally held down in the openings 29 in locking position and are prevented from falling radially outwardly thereof by a locking sleeve 31 which may have a smaller or larger external diameter than the male and female members.

The external diameter of the inner sleeve 22 is here shown as less than the external diameter of the female member 10 to provide an annular shoulder 32 spaced longitudinally from the free end of the sleeve 22 and from the shoulder 28 of the male member. When the two members are coupled, the shoulders 28 and 32 form a deep annular recess 33. In this recess, substantially below the external surfaces of the coupling members, is disposed the locking sleeve 31 which is slidable longitudinally on the external surface of the female sleeve 22. Thus, when the male and female members are coupled together, their shoulders 28 and 32 will be spaced apart longitudinally to define an annular recess 33 whereby the exterior surface of the locking sleeve 31 will be positioned entirely down below the top of this recess and well inside of the exterior diameter of the male and female members so as not to be struck with foreign objects or kicked to accidentally operate the locking sleeve. However, if this feature is not desired in certain uses of the coupler, the locking sleeve can be of increased diameter, or can be provided with an annular radial rib 34 having greater external diameter than the male and female members to provide a grip by which the locking sleeve can be conveniently operated without reaching down into the recess 33.

The locking sleeve 31 has a cam rib 35 formed on its inner circumference to provide a shoulder normal to its axis and against which one end of a compression spring 36 abuts, with the outer end of the spring abutting the shoulder 22' to normally bias the locking sleeve to a locked position against a stop ring or collar 37 anchored to the end of the sleeve 22, in which position the face of the rib 35, which is coaxial with the axis of the coupler, engages the balls 30 to hold them in locked position. The outside surface of this cam rib 35 is formed at about a forty-five degree angle to cam the balls into locked positions and allow them to ride radially outwardly of the holes 29 when the locking sleeve is moved to compress the spring 36, and the male nipple 23' is pulled out of the female member to separate them.

Figure 2:
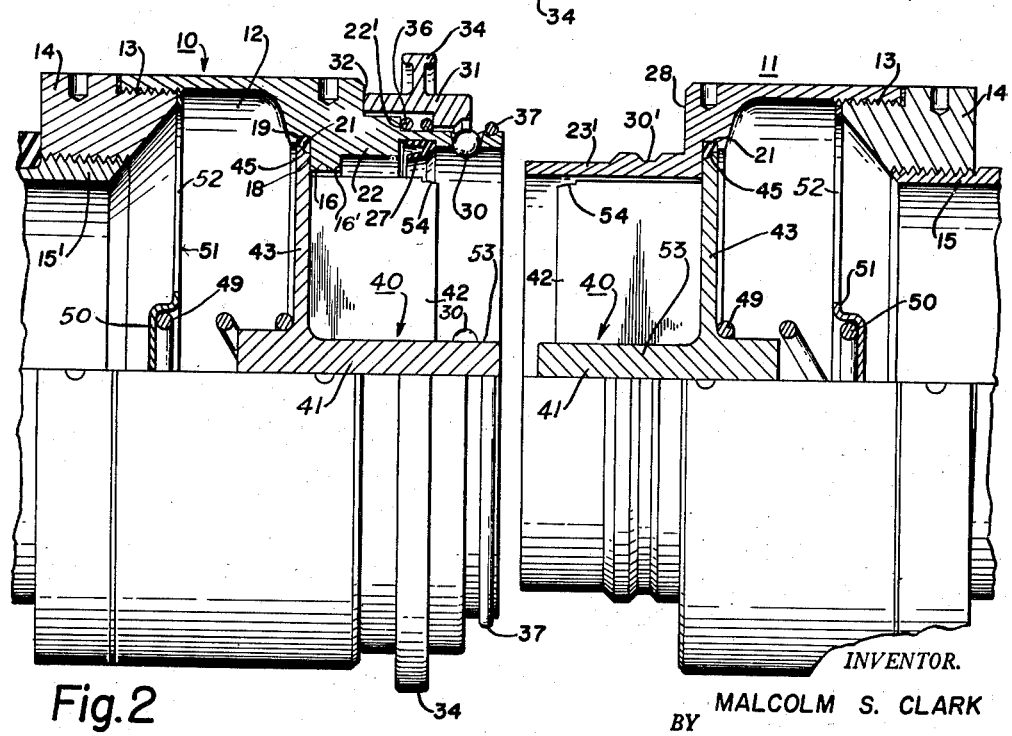
Figure 2 is a similar view showing the two units separated or uncoupled and their valves automatically closed.

Either or both the male and female members may each be provided with a check valve 40 to automatically close upon separation of the members in order to stop the fluid flow therethrough and to exclude foreign matter therefrom, or to automatically open by the act of connecting the coupling members together. The construction of the check valve for the male and female members is generally similar to their construction shown in my copending application Serial No. 390,594, so that they are interchangeable. Thus, each check valve 40 includes a stem portion 41 having three radial vanes 42 extending longitudinally of the stem with their longitudinal edges slidable on the walls of the primary bore 16 of the female member or the walls of the primary bore 23 of the male nipple. The stem portion 41 is provided with an enlarged metal disc-shaped valve head 43, which may be formed integrally therewith or as a separate disc suitably secured thereto. This head is of larger diameter than the primary bore 16 or 23 to operate in the larger secondary bore of its coupling member so as not to retard the flow of fluid when in open position. As distinguished over the valves of my aforesaid copending application, the periphery of this metal head 43 is provided with first, second and third circumferential surfaces 44, 45 and 46 and with a radial surface 47 adjoining the surface 46. The surface 45 intermediate the surfaces 44 and 46 is beveled at an angle of about thirty degrees and is adapted to engage and compress the O-ring 21 in its recess when the valve head is closed with its metal surface 47 engaging the metal valve seat surface 18. Thus, this metal to metal engagement, limits the degree of compression of the rubber O-ring to thereby increase its life. When seated, the surface 44 of the valve head slides under the wall or rib 20 to engage and fully enclose and trap the O-ring as illustrated in Figures 2 and 6.

One end 48 of the valve stem forms a button about which is disposed one coiled end of a compression coil spring 49 to bear against the valve head 43. The other end of this spring is seated in a central depression 50 formed in a spider disc 51, which latter is pressed by the spring 49 against the inner end of the adaptor 14. This spider disc is arranged in the secondary bore 12 of its coupling member and is provided with a plurality of large circular openings 52 to insure unimpeded flow of fluid through the coupling when the valve is in an open position. The spring 49 is formed with a coil or convolution at each end squared for solid abutment and has a spiral connecting portion. This spring and the spider constitute means for normally biasing the valve toward its seat.

The other end 53 of the valve stem also projects axially of the coupling member and is extended beyond the free edges of the vanes 42 to a point where it does not project beyond the inner end of the member in which it is mounted when the coupling members are uncoupled and the valve head 43 is in a closed position. The end 53 of the valve stem for the male member does not extend quite as far beyond the vanes 42 as does the end of the valve stem for the female member. However, the ends 53 of the valve stems for both coupling members can be made of equal length for interchangeability, with suitable proportioning of the length of the male nipple 23'.

When the male nipple 23' is inserted in the female member, the two valve stem ends 53 will be axially aligned and engaged to move the valve heads 43 of both members from their seats 18 to automatically open the valves. As the locking sleeve 31 is retracted against the tension of the spring 36 and the nipple is moved into the female member, the balls 30 will be moved radially outward permitting full insertion of the nipple, after which the sleeve 31 is released to ride its cam rib 35 over the balls and press them into locking engagement with the groove 30' of the nipple to hold the coupling members coupled. In this condition, the valve heads 43 will be disposed in full open positions within the enlarged secondary bores 12 whereby fluid flow through the coupler will not be impeded. At the same time, since the O-rings are carried by the casing elements of the coupler members out of the direct path of fluid flow, their positions will be secure and there will be no danger of the flow of fluid washing the rings out of position. Also, when the coupler members are uncoupled and the valve heads 43 are moved to closed positions with a metal to metal contact with their seats 18, the O-rings 21 will be compressed to a controlled degree limited by the metal to metal contact of the valves with their seats and be completely enclosed in their recess 19 to protect them from the pressure of fluid from within and from extraneous material from without. The free corners of the vanes 42 of the female member may, if desired, be recessed or shouldered as at 54 to provide abutments with the free end of a different size male nipple 23' to control movement of the valve of the female member. Such provision is made, when only the female member is provided with a valve and the male member has no valve; or when both members have valves and it is desired to operate the valve of the female member by direct contact with the male nipple and a valve of the male member is operated by contact with some part of the female member.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A detachable coupling comprising separable male and female members, said male member having an enlarged bore and a nipple with a smaller coaxial bore communicating therewith and forming a metallic valve seat flange at the juncture of said bores normal to the axis thereof, said female member having an enlarged bore of substantially the same size as said enlarged bore of said male member, said female member having a nipple receiving coaxial bore smaller than said enlarged bore for telescopically receiving said nipple of said male member, all of said bores including cylindrical walls parallel to the axis of said coupling, said female member having an annular flange extending radially inward at the juncture of its larger and smaller bores to form a metallic valve seat normal thereto and a valve guide parallel with the axis of said female member, said annular flange of said female member defining an opening having a diameter substantially equal to the diameter of the smaller bore in said male nipple, each of said male and female members having an annular radially extending rib in the enlarged bore thereof spaced from said annular flange thereof, said rib defining an opening of smaller diameter than said flange opening to define an annular recess between said rib and flange in said larger bore of each of said members, a rubber-like O-ring contained in each of said recesses, interchangeable valves in said male and female members and each including a valve stem having radial vanes, the vanes of said male member slidably engaging the smaller bore of said male member, the vanes of said female member slidably engaging the walls of said opening in said annular flange in said female member, each of said valves having an enlarged metallic head operating in the enlarged bore of its respective member and biased to its respective metallic seat formed by said flange, the periphery of each valve head having a beveled surface confined between first and second stepped parallel surfaces, one of said parallel surfaces being movable with the valve under said annular rib to confine said O-ring in its recess, said beveled surface and said other parallel surface being movable with the valve into engagement with said O-ring to compress the same until stopped by said metallic valve head engaging its metallic seat, and latching mechanism for holding said members in coupled telescopic relation, and means on said valves contacting each other to open said valves when said male and female members are coupled together.

References Cited in the file of this patent
UNITED STATES PATENTS

| | | |
|---|---|---|
| 2,083,584 | Wineman | June 15, 1937 |
| 2,263,750 | Willke | Nov. 25, 1941 |
| 2,278,580 | Coles et al. | Apr. 7, 1942 |
| 2,413,730 | Samiran | Jan. 7, 1947 |
| 2,425,500 | Wiggins | Aug. 12, 1947 |
| 2,441,075 | Krapp | May 4, 1948 |
| 2,453,480 | Williamson | Nov. 9, 1948 |
| 2,457,251 | Main | Dec. 28, 1948 |
| 2,543,590 | Swank | Feb. 27, 1951 |
| 2,638,914 | Flaith | May 19, 1953 |
| 2,648,548 | Scheiwer | Aug. 11, 1953 |